United States Patent [19]

Jeong et al.

[11] Patent Number: 5,602,697
[45] Date of Patent: Feb. 11, 1997

[54] APPARATUS FOR FIXING A SPINDLE MOTOR TO A HARD DISK DRIVE BASE

[75] Inventors: Woo-Cheol Jeong, Seoul; Jin-Tai Chung, Seongnam, both of Rep. of Korea

[73] Assignee: Samsung Electronics Co., Ltd., Suwon, Rep. of Korea

[21] Appl. No.: 366,585

[22] Filed: Dec. 30, 1994

[30] Foreign Application Priority Data

Dec. 30, 1993 [KR] Rep. of Korea ............... 1993-31326

[51] Int. Cl.$^6$ ............... G11B 5/012; G11B 17/00; G11B 33/14; G11B 17/02
[52] U.S. Cl. ............... 360/97.02; 360/97.01; 360/99.08
[58] Field of Search ............... 360/99.12, 97.01, 360/98.07, 98.08, 97.02, 99.05; 369/271, 263, 264

[56] References Cited

U.S. PATENT DOCUMENTS

| | | | |
|---|---|---|---|
| 4,553,183 | 11/1985 | Brown et al. | 360/97.02 |
| 5,267,106 | 11/1993 | Brue et al. | 360/98.08 |
| 5,282,100 | 1/1994 | Tacklind et al. | 369/263 |
| 5,366,200 | 11/1994 | Scura | 360/97.02 |
| 5,485,331 | 1/1996 | Dunfield et al. | 360/99.08 |

FOREIGN PATENT DOCUMENTS 1-42052  2/1989  Japan .

*Primary Examiner*—A. J. Heinz
*Assistant Examiner*—Adriana Giordana
*Attorney, Agent, or Firm*—Cushman Darby & Cushman IP Group of Pillsbury Madison & Sutro LLP

[57] ABSTRACT

An apparatus for fixing the spindle assembly in the base of a hard disk drive includes a supporting device positioned on an outer periphery of a round hole formed in a bottom surface of the base. The supporting device has a strip-shaped protrusion over the bottom surface of the base that directly contacts the hub of the spindle motor assembly to the base of the hard disk drive. This concentrates the forces to a smaller area and better secures the spindle motor assembly to the base of the hard disk drive.

10 Claims, 5 Drawing Sheets

APPARATUS FOR FIXING A SPINDLE MOTOR TO A HARD DISK DRIVE BASE

BACKGROUND OF THE INVENTION

1. Field of the Invention

The present invention relates to a hard disk drive usable as an auxiliary memory for computers, and particularly to an apparatus for fixing in a base a spindle motor rotating disks in the hard disk drive.

2. General Description of Related Art

A term "NRRO(Non Repeatable Run Out)" mentioned hereinafter in the present invention defines a phenomenon caused by non-periodic displacement when a spindle motor revolves about an axis. The NRRO relates to precision in working, shockproofness and stiffness of bearings.

The conventional hard disk drive, as shown in FIG. 1, has a spindle motor 56 that rotates a disk at a predetermined speed and a base 50 in which the spindle motor 56 is fixed. The spindle motor 56 has a hub 58. The hub 58 has screw head mounting recesses 60 and holes 62. The base 50 in which the spindle motor 56 is mounted is a casting. Further, the base 50 has a hub mounting surface 52 and screw holes 54. The hub mounting surface 52 is formed by the precise working of the bottom of the base 50.

As shown in FIG. 2, the hub 58 of the spindle motor 56 is mounted in the hub mounting surface 52 of the base 50 and screws 64 are then driven into the screw hole 54 of the base 50 through the holes 62 of the hub 58 so that the spindle motor 56 can be fixed in the base 50.

Because the precision ratio of working has a limited value, the conventional spindle motor 56, as shown in FIG. 3, is in partial contact with the base 50, so microscopically the contact surface therebetween is not a complete plane, but a plane having areas of rises and depressions. Therefore, the hub of the spindle motor partially contacts the hub mounting surface of the base. Then, portions in which they are not contacted with each other remain as gaps.

Such partial contact changes the stiffness of the fastening part to nonlinearity. That is, the compression force between the vibrating spindle motor and the base changes. Increases in the compression force occur when the contact position increases, and decreases in the compression force occur when the contact position decreases. This means that the compression force in the contacted position affects the stiffness of the fastening part. Such non-linearity disturbs the low frequency vibration of structures and produces relative displacement between the spindle motor and the base.

Therefore, in the hard disk drive, the vibration of the spindle motor has undesired influences on the NRRO characteristic. This brings a track missing error to disk when a head moves to read and write information on the disk. The track missing makes physical errors during an input/output operation to thereby reduce reliability of the hard disk drive.

The inside of the hard disk drive isolated from the external environment normally requires the most high degree of cleanness for error-free operation. Therefore, the inside of the hard disk drive should be prevented from contamination possibly generated by dust or gas. Thus, care must be taken when attaching the spindle motor onto the base to ensure an airtight hard disk drive. In this case, in order to improve the roughness and the flatness of the working surface, much working time is required and more working surfaces makes its production cost high.

SUMMARY OF THE INVENTION

It is therefore an object of the present invention to provide an improved hard disk drive having better vibration characteristics and less non-repeatable run out errors.

It is another object of the present invention to provide an apparatus for preventing the inside of a hard disk drive from contamination by fixedly mounting a gasket between a spindle motor and a base and by ensuring airtightness of the inside.

It is further object of the present invention to provide an apparatus capable of reducing working time and production cost of a base by decreasing contact surfaces between a spindle motor and a base.

The apparatus for fixing the spindle motor assembly in the base in the hard disk drive, comprises a supporting device positioned on an outer periphery of a round hole formed in a bottom surface of the base in contact with a hub of the spindle motor. The supporting device has a strip-shaped protrusion over the bottom surface of the base. This strip shaped protrusion directly contacts the hub of the spindle motor assembly to the base of the hard disk drive. This concentrates the forces to a smaller area and better secures the spindle motor assembly to the base of the hard disk drive.

BRIEF DESCRIPTION OF THE DRAWINGS

The above and other objects, advantages and features of the present invention will be more apparent from the following detailed description taken with the attached drawings in which.

DETAILED DESCRIPTION OF THE PREFERRED EMBODIMENTS

The term "relative displacement" mentioned hereinafter indicates that displacements of Points A and B are $r_A$ and $r_B$ respectively. Further, an equation "$r_{AB}=r_B-r$" shows that a relative displacement of the point A on the point B.

Figure 4:
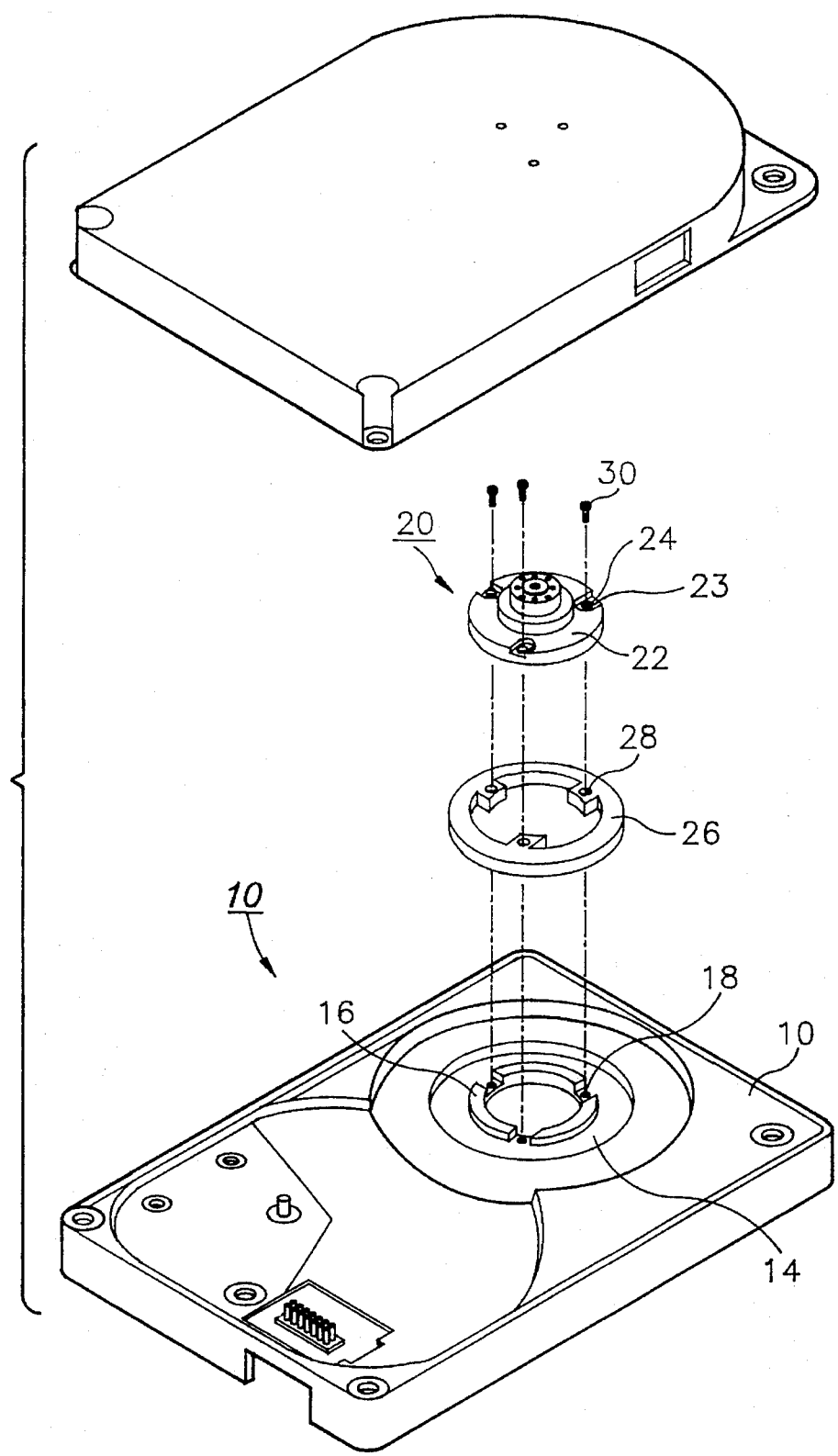
FIG. 4 is a separate perspective view of a base and a spindle motor assembled therein according to the present invention.

FIG. 4 is a separate perspective view of the hard disk drive according to the present invention. The spindle motor 20 and a gasket 26 are fixed in a base 10 by a screw 30.

Figure 1:
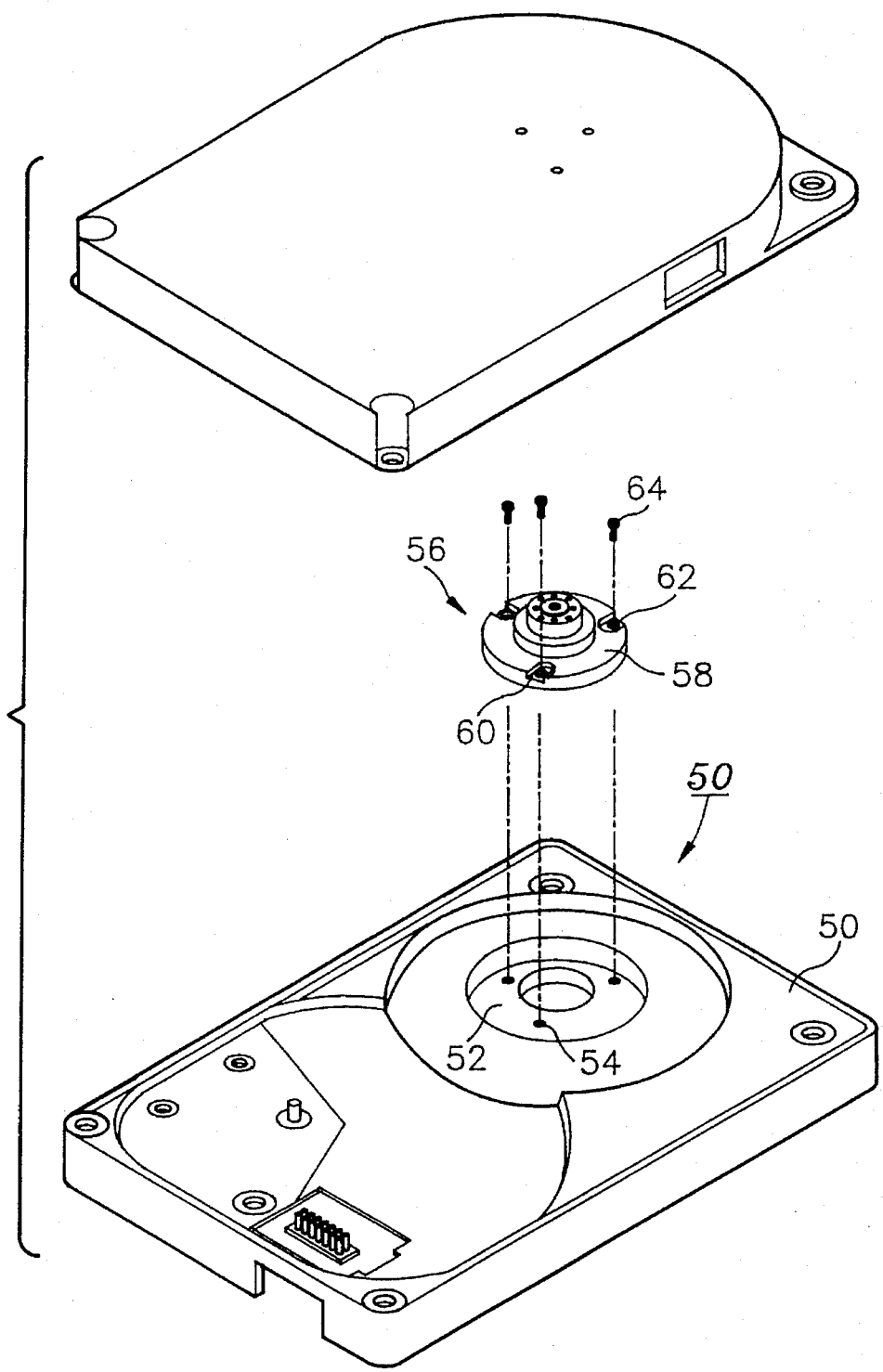
FIG. 1 is a separate perspective view of a base and a spindle motor assembled therein according to a conventional hard disk drive.
Figure 2:
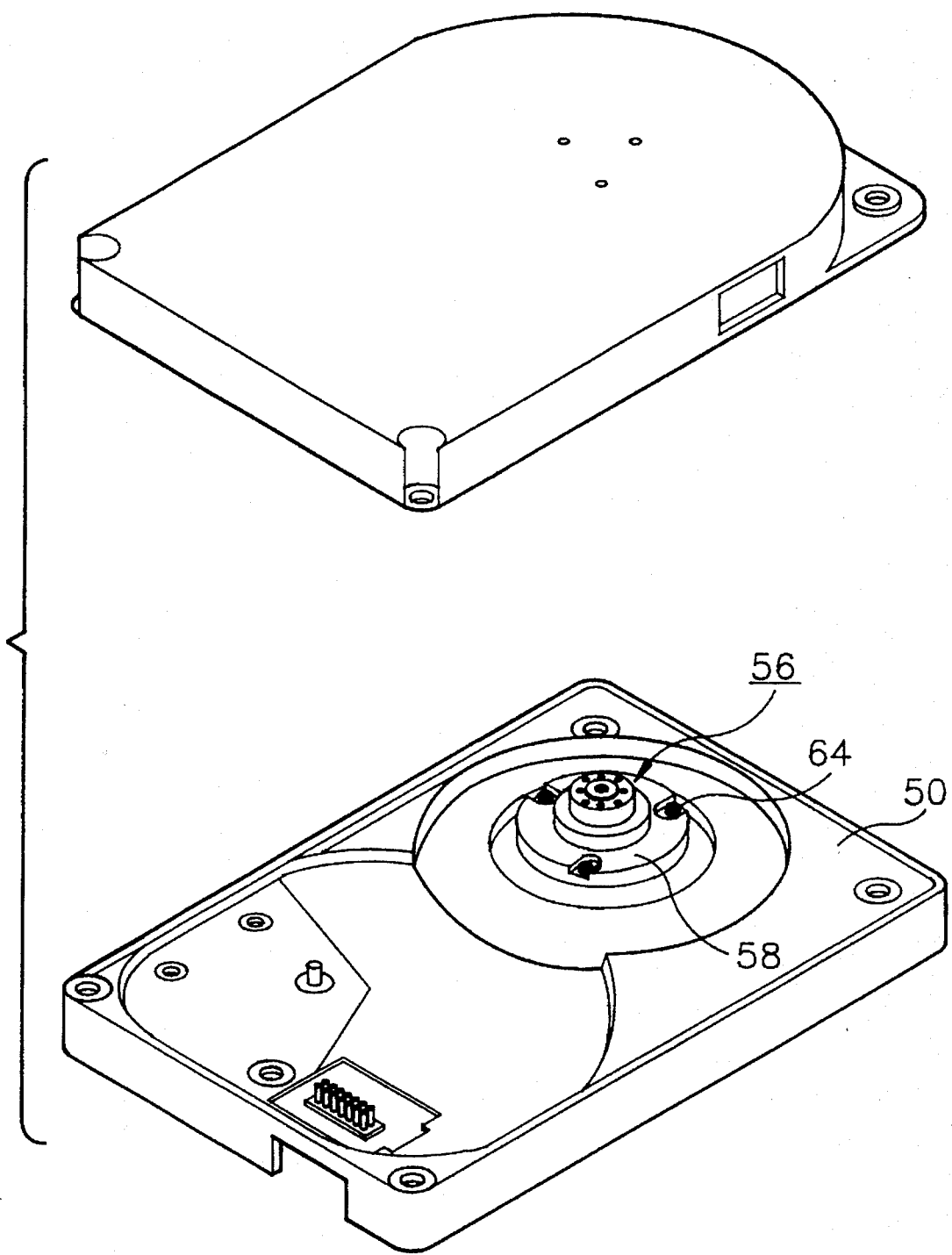
FIG. 2 is a perspective view showing that a spindle motor is assembled into a base according to a conventional hard disk drive.
Figure 3:
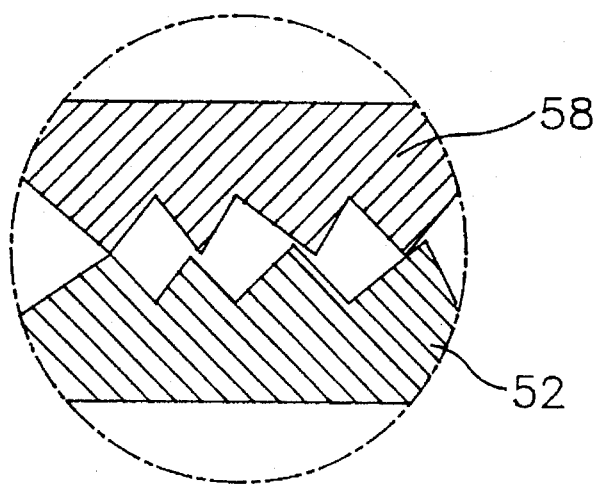
FIG. 3 is a cross-sectional view showing that a hub of a spindle motor of FIG. 2 contacts a base.

The hard disk drive according to the present invention, as shown in FIG. 3, has the spindle motor 20 that rotates a disk at a predetermined speed and the base 10 in which the spindle motor 20 is fixed.

The spindle motor 20 has a hub 22. The hub has screw head mounting recesses 23 and holes 24. The base 10 in which the spindle motor 20 is mounted is a casting. Further, the base 10 has a gasket mounting surface 14, a supporting device 16 for supporting the hub 22 of the spindle motor 20 and the internal screw 18. The hub 22 is mounted in the supporting device 16 which is precisely worked. Further, the gasket 26 for maintaining the airtightness inside the hard disk drive, is mounted in the gasket mounting surface 14. The supporting device 16 is projected by 0.7 mm to 0.8 mm from the gasket mounting surface 14. Also, the supporting device 16 may consist of three or four portions.

The hard disk drive according to the present invention, as shown in FIG. 4, installs the gasket 26 for maintaining the airtightness inside the hard disk drive in the gasket mounting surface 14. The gasket 26 has a hole 28 into which the screw 30 is driven. Further, the gasket 26 can be made of rubber or foaming polystyrene and has a thickness of 1.5 mm.

Figure 6:
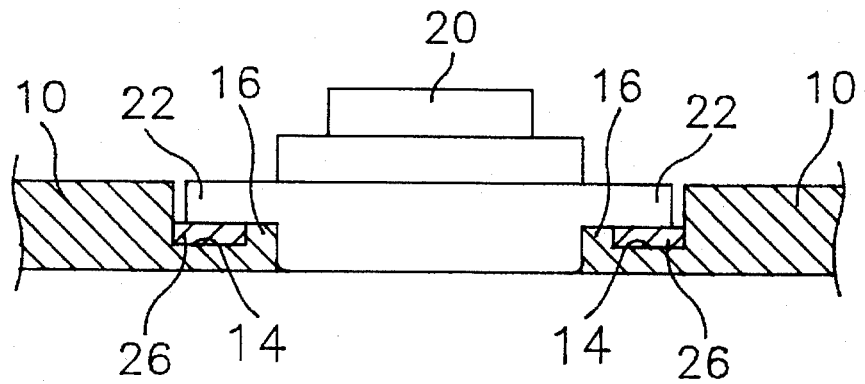
FIG. 6 is a cross-sectional view showing that a hub of a spindle motor of FIG. 5 contacts a supporting device of a base.
Figure 5:
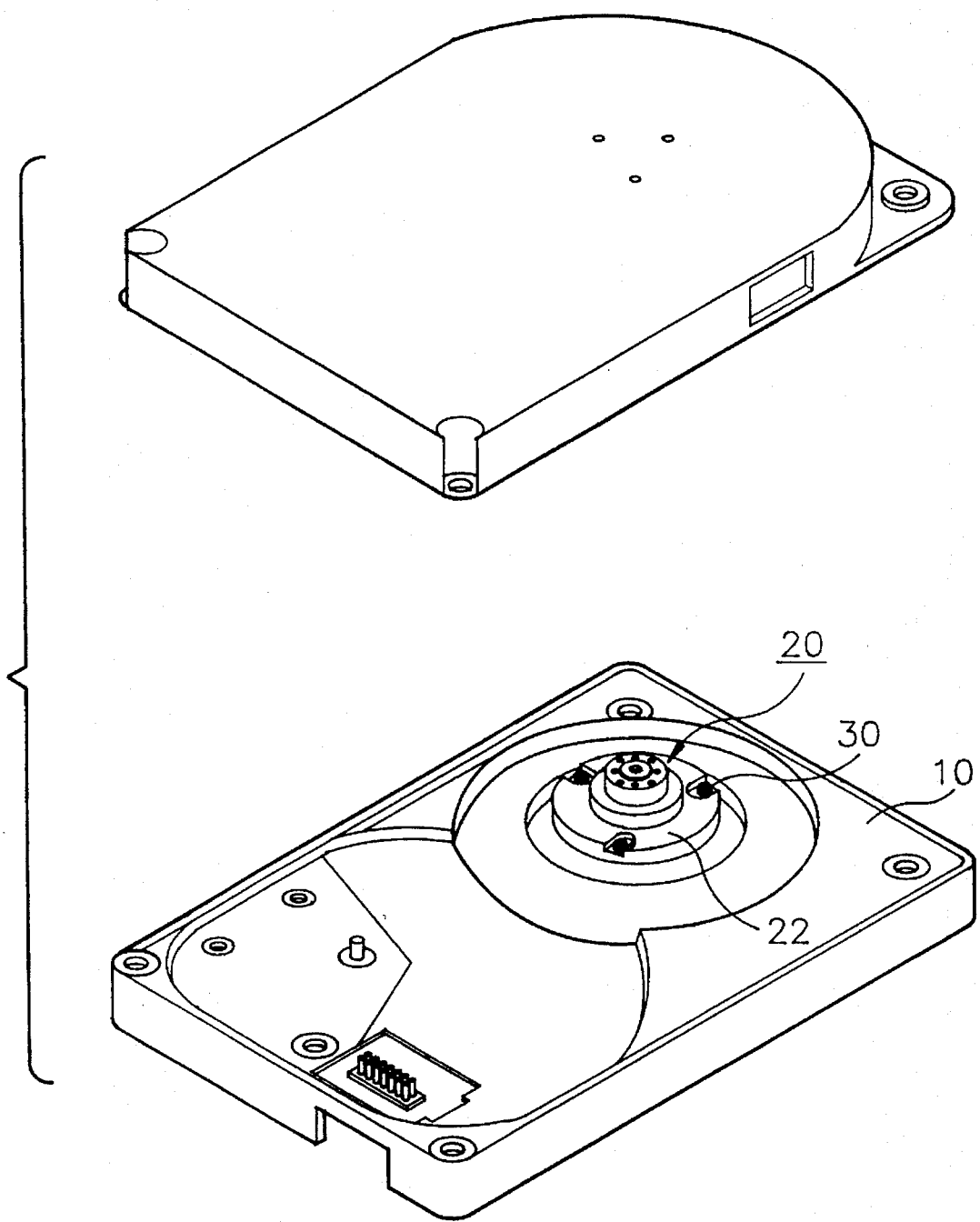
FIG. 5 is a perspective view showing that a spindle motor is assembled into a base according to the present invention.

As shown in FIGS. 5 and 6, the hub 22 of the spindle motor 20 is mounted in the supporting device 16 of the base 10. The screw 30 is driven into the internal screw 18 of the base 10 through the hole 24 of the hub 22. Thereby, the spindle motor 20 is supported by the supporting device 16 and is then fixed. The gasket 26 mounted between the hub 22 of the spindle motor 20 and the gasket mounting surface 14 of the base 10 is compressed by 50 percent of the thickness by fastening force of the screw 30. Further, the fastening force of the screw 30 functions in the hub of the spindle motor 20 and the supporting device 16, so that the contact compression force is provided therewith.

As mentioned above, in the hard disk drive according to the present invention, the spindle motor 20 is supported by the supporting device 16 of the base 10 and is then fixed, thereby reducing the vibration of the spindle motor. Further, since the compression force is constantly provided to the contact surface, it is possible to obtain stable vibration.

However, since the machining surface of the base in the conventional hard disk drive can not obtain a plane surface like glass, it actually obtains a shape of rises and depressions. Thus, the spindle motor 20, as shown in FIG. 3, is partially contacted. During fastening, force is substantially given in a small prominent portion, so that the stiffness of the contact surface becomes low. Meanwhile, when the stiffness becomes low, the relative displacement is increased. This is the same as the principle that a spring with low stiffness is greater than a spring with high stiffness in the relative displacement under the same force. According to the hard disk drive of the present invention, the spindle motor supported by a plurality of supporting devices concentrates the contact force on the supporting device 16, thereby obtaining stability in assembly. Further, there is an efficiency capable of reducing the working cost, since the contact surface in the present invention may be narrowly worked unlike the conventional art during processing the contact surface.

Also, owing to deformation due to the stress concentration on the supporting device 16 caused by fastening force between the hub 22 of the spindle motor and the supporting device 16, the stiffness increases enough and thus the relative displacement by vibration and impact given after assembling the spindle electric motor, is more reduced than that of the conventional art. Further, since the contact operation is performed in same surface, the linearity of the stiffness is superior to that of the conventional art.

As the hard disk drive of the present invention uses the gasket to maintain the airtight of the inside thereof, there are efficiencies capable of minimizing working cost by reducing time and process required in working the contact surface of the spindle motor and the base and capable of improving productivity.

What is claimed is:

1. An apparatus for securing a spindle motor assembly to a base of a hard disk drive, said base having a round hole formed in a bottom base surface and said spindle motor assembly having a hub with a bottom hub surface, said apparatus comprising:

supporting means positioned around a periphery of said round hole of said base, said supporting means having a strip-shaped protrusion which extends above said bottom base surface;

gasket means arranged adjacent said strip-shaped protrusion of said supporting means and over said base for resiliently sealing the space between said bottom hub surface and said base; and fixing means for securing said hub to said base to support said spindle motor assembly, said fixing means causing said bottom hub surface to directly contact said strip shaped protrusion.

2. The apparatus according to claim 1, wherein said strip shaped protrusion includes at least three arc shaped support pieces, each arc shaped support piece having a flat top surface which extends above said base and wherein said fixing means includes a plurality of holes, each said hole having an internal thread formed in said base at a position between two adjacent arc shaped support pieces, each said hole receiving a screw which also protrudes through a screw head hole in said hub.

3. The apparatus according to claim 2, wherein said gasket means includes ring-shaped holes formed in each of at least three ribs, each of said ribs positioned at said positions between said adjacent arc shaped support pieces.

4. The apparatus according to claim 3, wherein said gasket means is made of one of rubber and foaming polystyrene.

5. An apparatus for securing a spindle motor assembly to a base of a hard disk drive, said base having a round hole formed in a bottom base surface of said base and said spindle motor assembly having a hub with a bottom hub surface, said apparatus comprising:

supporting means positioned around a periphery of said round hole of said base, said supporting means having a strip-shaped protrusion which extends above said bottom base surface; and fixing means for securing said hub to said base to support said spindle motor assembly, said fixing means causing said bottom hub surface to directly contact said strip shaped protrusion, said strip shaped protrusion including at least three arc shaped support pieces, each arc shaped support piece having a flat top surface which extends above said base, and said fixing means including a plurality of holes, each said hole having an internal thread formed in said base at a position between two adjacent arc shaped support pieces, each said hole receiving a screw which also protrudes through a screw head hole in said hub.

6. An apparatus for securing a spindle motor assembly to a base of a hard disk drive, said base having a round hole formed in a bottom base surface and said spindle motor assembly having a hub with a bottom hub surface, said apparatus comprising:

a strip-shaped protrusion positioned around a periphery of said round hole of said base which extends above said bottom base surface;

a fastener which secures said hub to said base to support said spindle motor assembly, said fastener causing said bottom hub surface to directly contact said strip shaped protrusion; and a gasket arranged adjacent said strip-shaped protrusion and over said base, said gasket resiliently sealing the space between said bottom hub surface and said base adjacent said strip-shaped protrusion.

7. The apparatus according to claim 6, wherein said strip shaped protrusion includes at least three arc shaped support pieces, each arc shaped support piece having a flat top surface which extends above said base, and wherein said fastener includes a plurality of holes, each hole having an internal thread formed in said base at a position between two adjacent arc shaped support pieces, each said hole receiving a screw which also protrudes through a screw head hole in said hub.

8. The apparatus according to claim 6, wherein said strip shaped protrusion includes at least three arc shaped support pieces, each arc shaped support piece having a flat top surface which extends above said base, and wherein said fastener includes a plurality of holes, each hole having an internal thread formed in said base at a position between two adjacent arc shaped support pieces, each said hole receiving a screw which also protrudes through a screw head hole in said hub.

9. The apparatus according to claim 8, wherein said gasket includes ring-shaped holes formed in each of at least three ribs, each of said ribs positioned at said positions between said adjacent arc shaped support pieces.

10. The apparatus according to claim 9, wherein said gasket is made of one of rubber and foaming polystyrene.

* * * * *